July 26, 1960 W. R. SEIPT 2,946,158
COMPOSITE BUILDING UNIT
Filed June 7, 1954
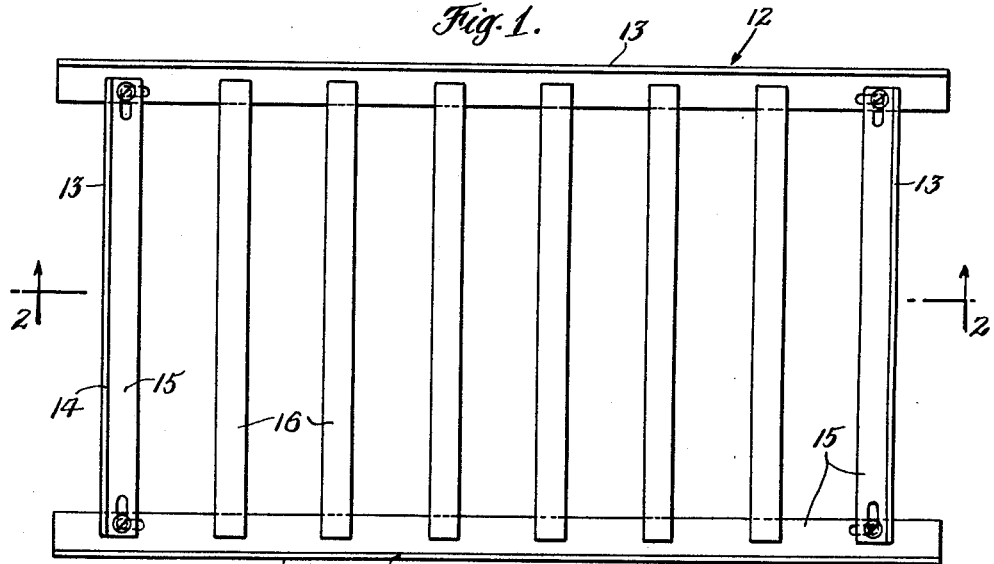
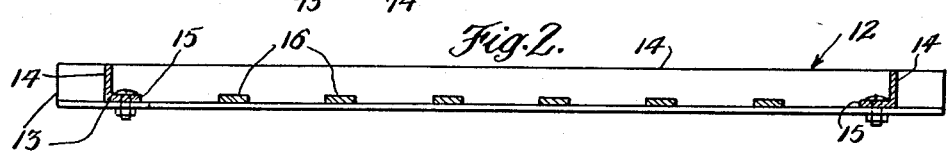
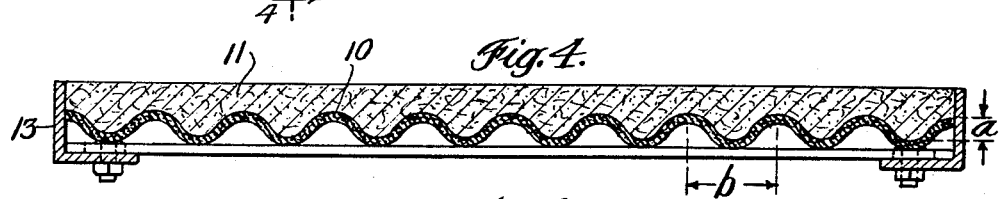
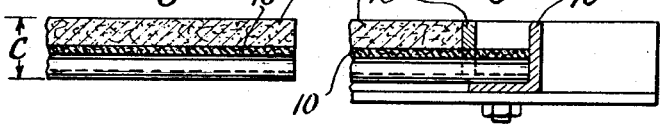
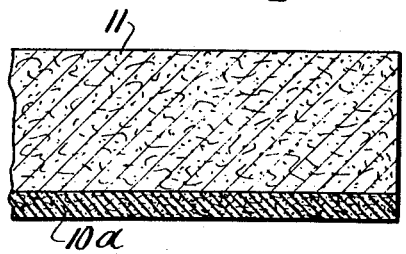
INVENTOR
Willard R. Seipt
BY
Synnestvedt & Lechner
ATTORNEYS

United States Patent Office 2,946,158
Patented July 26, 1960

2,946,158
COMPOSITE BUILDING UNIT

Willard R. Seipt, North Wales, Pa., assignor to Keasbey & Mattison Company, Ambler, Pa., a corporation of Pennsylvania Filed June 7, 1954, Ser. No. 435,089

11 Claims. (Cl. 50—413)

This invention relates to composite insulating and structural materials, and is particularly concerned with a hydrous calcium silicate-type building unit having both structural and insulating properties and comprising a dense and strong member with a light insulating member bonded integrally thereto.

It is a primary object of the invention to provide a building element, useful for roofing, siding and the like, which has the structural strength necessary for such purposes, and also provides effective thermal insulation.

It is a further object of the invention to provide a building element of the kind above described that is light in weight, but sufficiently strong to support heavy loads even when large units are supported at widely separated points.

My novel composite building unit comprises two elements, each of which is similar to a known type of single building unit. Thus, the strength member may take the form of a sheet of asbestos fiber bonded with Portland cement, which, in the preferred embodiment of the invention, may be corrugated. Sheets of this general kind are known and have been used for many years as roofing, siding and the like.

The insulating member of my building unit comprises cast hydrous calcium silicate, preferably reinforced with asbestos fibers. This material, as it known, is an extremely effective insulator and can be produced in masses of very low density having excellent insulating properties.

How the foregoing objects and others which will appear are attained will be more clearly understood from the detailed description which follows and from the drawings, in which Fig. 1 is a plan view of a forming frame used in practicing the invention; Fig. 2 is a longitudinal section on the line 2—2 of Fig. 1; Fig. 3 is a similar longitudinal section but showing the frame adjusted to the size of a unit being formed; Fig. 4 is an enlarged cross-section taken on the line 4—4 of Fig. 3; Fig. 5 is a fragmentary section of my finished composite building unit employing a corrugated strength member; Fig. 6 is a fragmentary section illustrating the formation of a composite building unit embodying an undercut end; Fig. 7 is a fragmentary section of the building unit formed according to Fig. 6; and Fig. 8 is a fragmentary section drawn at half-size of a composite building unit employing a flat strength member.

According to the preferred embodiment of the invention, an asbestos cement sheet, which is made up of a mix containing an excess of silica, is formed in the usual way and allowed to cure, at which time lime is released from the cement. The cured sheet is then placed in the bottom of a mold, and a water slurry of lime, asbestos fiber, and silica and/or silica bearing material is poured onto the sheet in the mold to the desired depth. The mold with the sheet and the slurry therein is then placed in an autoclave and subjected to saturated steam at a pressure of about 125 lbs. per sq. in. for about 12 hours, during which time a light-weight mass of crystalline calcium silicate is formed from the ingredients of the slurry. At the same time, the calcium and silica of the light-weight layer react with the free lime and silica of the dense layer, across the interface between the sheet and the slurry, to form an extremely strong physical bond.

The pressure in the autoclave is then reduced gradually to atmospheric over a period of about three and a half hours, during which period the material loses about 28% of its free water. The wet product is then placed in a dryer where the remaining 72% of water is removed.

The resulting product is light, strong and has excellent insulating properties.

It will be understood that the proportions of the various ingredients of either element may be varied within the scope of the invention, and I have included in the description which follows examples of different mixes which may be used.

Furthermore, the physical proportions of the building unit may be varied, and I have tabulated hereinbelow the physical properties of units made up with different physical dimensions.

In the description which follows, I will first describe the manner in which the strength members are produced; then the formulation of the slurries from which the light-weight layers are produced; and finally, the manner in which the lightweight material is formed integrally with the strength member.

The sheets are made from a water slurry including lime and silica containing materials. A preferred mixture comprises a blend of 15% medium length asbestos fibers, 30% silica, and 55% Portland cement, all by weight. The solids in the water slurry are picked up on a screen and excess water drained out. The solid material is deposited on a felt to form a continuous web, which is then transferred to a cylinder. The web is built up on the cylinder in layers until the proper thickness is attained. The accumulated web of built up material is then split open to form a flat sheet. Corrugations, if desired, are roughly formed in the sheet and then pressed accurately into shape. The pressing operation removes some of the remaining water and forms a semi-rigid product. The formed and pressed sheets are then stacked and allowed to cure for a period of about a week.

As best seen in Fig. 4, sheets 10 of about 3/8" thickness are employed and, if corrugated, the corrugations may measure about 1.06" deep, measured perpendicularly from crown to valley, as indicated at $a$ in Fig. 4, and are shaped a distance of 4.2" from one to the next as indicated at $b$ in Fig. 4.

The light-weight material may be made up in different densities; for example, light-weight layers of a density of 20 lbs. per cu. ft. are prepared as follows:

A pebble quick-lime with an available lime (CaO) content of 90% or better and having a characteristic referred to in the lime industry as "immediate slaking" is used. 255 lbs. of such lime are weighed out and added slowly to 177 gallons of water under high speed agitation in a Cowles dissolver. After 20 minutes or more, the lime is completely hydrated and the slurry is pumped into a 6 ft. diameter Hydrapulper, wherein the solid ingredients are dispersed and blended into a uniform suspension. This equipment comprises a tub having a horizontal rotor disk located near its bottom and provided with vanes attached to its upper surface. The disk rotates at high speed producing blending by impact and by liquid attrition.

To the lime slurry in the Hydrapulper is added 36 lbs. of pulverized light-weight material reclaimed from previous production, 7.5 lbs. of a medium length Canadian Chrysotile fiber (Quebec Box Test 5R grade), and 85.5 gallons of water. This mixture is then blended for a 6 minute period. 64.5 lbs. of amosite (a long fiber variety of asbestos) fiber, grade M1, is now added and dispersed by mixing for several minutes. Prolonged agitation must be avoided to prevent excessive shortening of the Amosite fiber.

103.5 lbs. of 200 mesh pulverized silica and 180 lbs. of a natural diatomaceous earth are added and mixed in by an additional 6 minutes of agitation. The relatively fluid slurry is then allowed to flow into a horizontal spiral bladed mixer. An additional 78 lbs. of diatomaceous earth is added in the mixer. (The addition of the last increment of diatomaceous earth is deferred until this stage because its addition in the Hydrapulper would result in a slurry too heavy for proper blending.) The slurry is turned over in the spiral mixer for about 15 minutes and is then ready for the next step of the process.

The slurry 11 and the sheets 10, produced as above described, are brought together in a forming frame 12. Such a frame may consist of angle irons 13 adjustably bolted at their corners to form a rectangular frame, one web 14 of each angle iron being vertical and the other web 15 extending horizontally toward the inside of the rectangle. Flat bars 16 are laid across the frame with their ends resting on the horizontal webs of opposite angle irons. The height of the vertical web of the angle iron is such that the distance from the top of a dense sheet resting on the bars to the top of the vertical webs is equal to the desired thickness of the light-weight layer of the finished product.

A dense asbestos cement sheet 10 is now placed on the bars and the angle irons drawn in snugly against the edges of the sheet as shown in Figs. 3 and 4 to reduce all gaps to 1/8" or less, whereby to prevent the escape of slurry. In Figs. 3 to 7, the sheet 10 is of corrugated form and in Fig. 8 I have shown a sheet 10a of flat form.

The slurry 11 is then flowed onto the sheet within the frame. As seen in Fig. 3, a slight excess 17 is added, pushed out to the edges of the sheet and struck off level with the top edges of the frame by screeding and/or rolling.

One important precaution must be observed during this filling operation in order to produce a sound, completely bonded unit. Whenever the slurry rolls over the surface of the sheet or even over a smooth layer of previously deposited slurry, a poor bond between the slurry and sheet or between the two layers of slurry will result. The reason for this lack of adequate bonding is not fully understood, although it may be due to the fact that the surface of any slurry mass tends to be surrounded by a film of water. So long as the force propelling the mass is small enough, the water film remains intact on the surface and does not allow the solids within the slurry to make contact with the surface over which the slurry is moving, thereby preventing a bond from developing between them. Apparently this water film can only be broken, and thereby permit bonding to take place, by a force such as that produced by rapid changes in the direction of the slurry, or by high speed flow, producing eddy currents or turbulence.

In order to establish good contact between the slurry and the dense sheet, high speed impingement may be used, although this is frequently impractical because of excessive splashing and loss of material. A method which avoids these disadvantages is to pour the slurry in a relatively non-violent manner and then force the slurry solids into contact with the sheet by means of a rake or hoe. If a corrugated sheet is used, the hoe must be lifted vertically from one corrugation and inserted in the next, in order to avoid pushing the slurry completely out of place.

Lamination within the slurry itself is prevented by the techniques above mentioned. In addition, such lamination may be prevented by flowing the slurry out of a slot having dimensions such as to provide for depositing a solid layer of slurry on the sheet to the full depth and width required.

After the excess has been screeded off, the frame containing the sheet and the slurry is transferred to an autoclave where it is exposed to saturated steam at a pressure of approximately 125 lbs. per sq. in. for a period of approximately 12 hours. This indurating operation causes the lime of the slurry to react with the silica and diatomaceous earth to form a hydrous calcium silicate which sets to a firm mass. In addition, the corrugated sheet completes its setting reaction. The Portland cement in the sheet during its initial curing stage has liberated free lime, which, during the autoclave process, reacts with the silica to give the sheet its full strength and also reacts with some of the silica in the slurry to form a bond between the two layers. Furthermore, the lime of the slurry layer reacts during the autoclaving process with the free silica of the dense layer. As a result, the bond has a strength of the order of that of the light-weight hydrous calcium silicate layer itself.

When sheets are made up of a formula containing only asbestos fibers and Portland cement—without the additional pulverized silica—the inter-layer bond does not develop to full strength. Thus, it is important that both free lime and free silica be available at the surfaces of both the sheet and the slurry during the autoclaving process.

Insofar as the dense layer is concerned, the free lime is made available by the initial setting action of the Portland cement and the free silica is made available by the inclusion in the asbestos cement of silica in an amount equal to from 25% to 100% of the weight of cement, with a preferred value in the neighborhood of 55%.

Insofar as the light-weight material is concerned, any suitable hydrous calcium silicate formula may be employed, since both lime and silica in unreacted form will be available during the autoclaving action.

It will be understood, of course, that the density and other properties of the hydrous calcium silicate layer may be varied within wide limits without departing from the invention. The products whose physical properties are described herebelow include composite units made with light-weight layers of two different densities, namely, 20 lbs. per cu. ft. and 26 lbs. per cu. ft. The composition of the 20 lb. material was given above in the description of the formulation of the slurry, but is repeated herebelow to afford a comparison between the 20 and 26 lb. compositions:

| | Percentage (by Weight) of Composition Based on Total, Dry Solids | | | |
| --- | --- | --- | --- | --- |
| | 20 Density | | 26 Density | |
| | Solids | Water | Solids | Water |
| Lime (CaO) | 35.2 | | 36.1 | |
| Water with Lime | | 204 | | 209 |
| Reclaim | 5.0 | | 5.1 | |
| M-5R Fiber | 1.0 | | 1.0 | |
| Water Added | | 98 | | 13 |
| Amosite M-1 Fiber | 8.9 | | 6.4 | |
| 200 mesh Pulverized silica | 14.3 | | 40.3 | |
| Natural Diatomaceous earth | 35.6 | | 11.1 | |
| Total | 100.0 | 302 | 100.0 | 222 |

According to the invention, the light-weight element of the structural unit may be made with densities as low as 10 lbs. per cu. ft. and as high as 40 lbs. per cu. ft.

The density of hydrous calcium silicate is determined by the amount of water contained in the slurry at the time of its setting reaction. For the light-weight materials of my invention, the proportion of water in the slurry is much greater than that required to provide the water of hydration. The excess water, during the setting reaction, holds the crystals of hydrous calcium silicate apart so that a microporous structure is developed. When a large excess of water is used, the volume of the micropores makes up a large percentage of the total volume of the hydrous calcium silicate mass. During the drying operation, the water contained in the pores is driven off, leaving a light-weight microporous structure in which the micropores constitute from about 75% to 95% of the total volume of the mass.

The lower limit on the densities of the light-weight layer is determined by the tendency of the solids to settle out of thin slurries. Settling is prevented by the presence of bulky constituents, such as diatomaceous earth and asbestos fibers. For densities above about 40 lbs., neither is necessary. In the range 40 to 20 lbs., the asbestos fiber may be omitted if the ratio of diatomaceous earth to silica is increased above that of the examples set forth hereinabove. It is difficult to obtain densities below about 20 lbs. without including some asbestos fiber in the composition.

The percentage of the total volume of the hydrous calcium silicate made up of the micropores for the several densities is as follows:

| Density, pounds per cu. ft.: | Percentage of total volume occupied by micropores |
|---|---|
| 10 | 93.7 |
| 20 | 87.5 |
| 26 | 84.0 |
| 40 | 75.0 |

The composition of the dense layer of the finished product also includes hydrous calcium silicate. Thus, the composition by weight of the asbestos cement sheet above mentioned, after the autoclaving and drying operation, is about as follows:

| | Percent |
|---|---|
| Hydrous calcium silicate | 60 |
| Hydrous calcium aluminate | 5 |
| Fiber | 14 |
| Silica | 16 |
| Other | 5 |

The density of the hydrous calcium silicate of the dense layer is also determined by the amount of excess water contained in the dense element at the time of reaction. The sheet discussed hereinabove contains micropores making up about 34% of the total volume of the sheet; and sheets in which the micropores constitute from about 30% to 35% of the total volume are useful for purposes of this invention and will be found to have good structural strength characteristics.

It will be understood that the denser element of my structural unit may be made from other lime-and-silica-containing materials. For example, both elements may be made up in the manner above described in connection with the production of the insulating element. Thus, a composite structural unit may be made up of a 40-density element and a 10-density element. All composite units made in accordance with the invention, however, are characterized by the fact that both elements of the finished product contain large amounts of hydrous calcium silicate, that the two elements are integrally bonded by the formation of hydrous calcium silicate across the interface between them, and that the volume of at least one of the units is largely made up of micropores formed by setting in the presence of excess water.

The size and weight of the composite unit of my invention may be varied as desired. For most purposes, the optimum combination of weight and dimensions should provide the largest possible area of coverage with adequate load bearing capacity, maximum insulation value, and a weight low enough to enable the unit to be handled easily. A unit meeting these requirements is made up of a corrugated dense layer 3/8" in thickness with a hydrous calcium silicate layer of 20 lbs. density applied to give an overall thickness c in Fig. 5 of 2⅝". This unit is made up with a width of 42" and a length of 4½' or 6'.

For some purposes, it is desirable to provide an undercut edge or end, i.e., to produce a unit in which the dense layer is longer and/or wider than the light-weight layer. Most desirably, the unit is made up with a 6" undercut at one end as shown at 18 in Fig. 7. Such a unit is produced by applying a damming wall 19 (Fig. 6) across the sheet as it lies within the forming frame, at the point at which the undercut is to start. When corrugated sheets are used, the damming wall is, of course, provided with a lower surface which mates with the corrugations of the sheet.

Composite building units made in accordance with the invention have outstanding properties, particularly lightness, insulating qualities, and load bearing characteristics. When made with a 3/8" thick corrugated sheet having a layer of 20 density hydrous calcium silicate integrally bonded thereto by the process above described, and a thickness overall of 2⅝", my building unit has a bone-dry weight of 6.5 lbs. per sq. ft. Thus, a full size sheet of 6' long by 42" wide is easily carried by two men.

The highly desirable thermal properties of the building unit of the invention are brought out in the table just below in which the insulating properties of various materials are expressed in terms of "U," a factor which is a measure of the amount of heat per hour in B.t.u.'s that will flow through one square foot of a structural wall or roof for every degree Fahrenheit difference in temperature from one side of the wall or roof to the other.

| Material | "U" Factor |
|---|---|
| 1. 3/8" corrugated asbestos cement sheet | 1.13 |
| 2. 20 density hydrous calcium silicate (1.72" thick) | 0.26 |
| 3. Composite structure of 3/8" corrugated asbestos cement sheet and 20 density hydrous calcium silicate: | |
| (a) Light-weight layer 1.72" thick (Overall unit thickness 2.58") | 0.25 |
| (b) Light-weight layer 2.0" thick (Overall unit thickness 3½") | 0.18 |
| 4. Composite structure with 3/8" corrugated asbestos cement sheet and 26 density hydrous calcium silicate 1.6" thick (Overall unit thickness 2½") | 0.30 |

It will be seen from the above that the light-weight hydrous calcium silicate layer contributes most of the resistance of the composite unit to the flow of heat, and that the lower density material has better insulating properties than the denser material.

In spite of its light weight and its good insulating properties, the composite unit has excellent load bearing characteristics. The data which follows hereinbelow were obtained by supporting the dried units with the corrugated surface (except in Example 4) resting on two rounded bearing edges extending across the full 42" width of the sheet, near each end, and separated by the indicated distances. On top of the unit, resting on the surface of the light-weight hydrous calcium silicate layer, two additional rounded bearing edges were placed, also extending across the full width of the unit and supporting a platform upon which the test load was applied. The distances between these second bearing edges was ⅓ of that of the span between the bearing edges upon which the sheet itself was supported. Each of the upper bearing edges was located ⅓ of the span from the nearest lower bearing edge. Loads were placed on the platform in increments until the sheet broke. The thickness of the corrugated sheets was 3/8" in all examples.

| Description of unit | Overall unit thickness, inches | Test Span, feet | Number of Tests | Average Breaking Loads, pounds |
|---|---|---|---|---|
| 1. Corrugated sheet alone | | 5.5 | 2 | 1,630 |
| 2. 20 density lightweight layer alone | 2⅝ | 5.5 | (¹) | 350 |
| 3. 20 density with corrugated sheet | 3.0 | 5.5 | 4 | 3,290 |
| 4. 20 density with corrugated sheet, but upside down | 3.0 | 5.5 | 5 | 1,900 |
| 5. Corrugated sheet alone | | 7.0 | 11 | 1,340 |
| 6. 20 density lightweight layer with corrugated sheet | 3.85 | 7.0 | 2 | 4,740 |
| 7. 26.8 density lightweight layer with corrugated sheet | 2.81 | 7.0 | 1 | 3,750 |

¹ Calculated.

It will be seen from the above table that, depending upon the thickness and density of the light-weight layer, the strength of the unit is at least double, and in one case more than triple, the strength of the corrugated sheet alone, despite the fact that the light-weight unit alone is relatively weak. Other tests have shown that where the bond in the interface was poor, the components separated completely upon bending under relatively small loads and the breaking load was not much in excess of the corrugated sheet alone. It is thus clear that the load bearing characteristics of the composite element are related directly to the adequacy of the inter-layer bond. It is also clear from a comparison of Example 4 with Example 3 that the best result is obtained when the dense layer is under tension and the light-weight layer under compression.

The composite units of my invention may be applied and secured to the structural frame of a building in accordance with practices currently employed with similar materials. For flat roof decking, 6' long units may be laid on beams with the corrugated surface facing downward. The beams are spaced on 6' centers with the ends of two consecutive units butting against a row of studs secured along the center of the top surface of the beam. Grouting is applied between the units around the studs to hold the units in place, and the roof is finished off by applying a "built up" roofing layer.

For sloping roofs, 4½' units are used. The sheets are laid with the corrugated surfaces exposed to the weather, that is, on the upper side. The top edge of the composite unit rests on a beam. The beams are spaced at 4 foot intervals so that the lower edge of the sheet member, which is undercut by 6", will lap over the next lower unit. Each sheet is anchored to the beams by standard fasteners. The edges of adjacent sheets may meet in butt joints sealed by stripping applied over them or by providing an undercut and overlapping the sheets for a distance of one corrugation.

The application for side walls is similar to that for sloping roofs.

Among the advantages of the invention are the following:

The product is far lighter in weight per unit area than other composite units or built up constructions having similar strengths and insulating values.

The product is stronger than the plain asbestos-cement corrugated sheets which have been used for many years, and, when it is applied with the corrugated face downward, is more than double that of plain corrugated sheets, having a strength, depending upon the span of the supporting structure, of up to 200 lbs. per sq. ft. or more.

Because of its low weight and high strength, the material may be handled in large sheets, thus lowering application coats. In addition, the low weight per unit area reduces the amount of structural steel work required.

The insulating value of the material is so high that, for most building purposes, no additional insulation is necessary.

The product is completely fire-proof. Neither the structural component nor the insulating layer nor the bond will burn.

The product has a pleasing appearance and requires no surface preparation after erection.

I claim:

1. In the manufacture of a composite building unit, the steps of forming a sheet from a first water slurry of Portland cement, pulverized silica, and asbestos fiber; curing said sheet with release of lime from the cement ingredient; forming a slurry layer on said sheet by pouring thereon a second water slurry comprising lime and pulverized silica; autoclaving the sheet with the slurry layer thereon at a pressure of about 125 lbs. per sq. in. for about 12 hours in the presence of saturated steam to react the lime and silica of the sheet and of the slurry layer and to form lime-silica bonds within and between the sheet and layer; and reducing the pressure to atmospheric gradually over a period of about three hours to thereby provide an insulating layer of hydrous calcium silicate bonded to the sheet; the insulating layer having a lower density than the sheet to which it is bonded.

2. In the manufacture of a two-component structural unit, the steps of forming one component from a first water slurry of Portland cement, pulverized silica and asbestos fiber; pressing said slurry into a sheet of desired shape with removal of water; curing the sheet, with release of lime from the cement ingredient; pouring onto the sheet a second water slurry of lime, asbestos fiber, and pulverized silica to form a second component; autoclaving the sheet with the slurry thereon at a pressure of about 125 lbs. per sq. in. for about 12 hours in the presence of saturated steam to react the lime and silica of the two components, and to form lime and silica bonds within and between the two components; reducing the pressure to atmospheric gradually over a period of about three hours to convert the second water slurry to a light-weight hydrous calcium silicate asbestos layer bonded to a dense hydrous calcium silicate layer; and drying the bonded components.

3. In the manufacture of a composite structural unit, the steps of: forming an element from a mixture of Portland cement, silica and a small amount of water; curing said element with release of lime from the cement; casting a slurry mass containing lime, silica and a large amount of water into contact with the surface of said element; heating said element with said mass in contact therewith in the presence of saturated steam to react the lime and silica in said element in the presence of said small amount of water to convert said element to a compact hydrous calcium silicate containing a relatively small amount of free water, reacting the lime and silica of said mass in the presence of said larger amount of water to produce a porous hydrous calcium silicate structure containing a relatively large amount of free water, and reacting the lime and silica of said element and of said mass across the interface therebetween to form a hydrous calcium silicate bond; said reaction being effected by heating said element with the said mass in contact therewith and in the presence of saturated steam; and thereafter removing the water from the so formed reaction product to produce a composite unit of hydrous calcium silicates of differing densities; namely a hydrous calcium silicate strength member integrally bonded to a lighter density hydrous calcium silicate insulating element.

4. The process of manufacturing composite structural units which comprises: forming a first element from a mixture containing lime, silica, and an amount of water exceeding by a first percentage the amount required in the formation of hydrous calcium silicate therefrom; forming a second element in contact with the first from a mixture containing lime, silica, and an amount of water exceeding by a second percentage, greater than the first, the amount required in the formation of hydrous calcium silicate therefrom; heating said two elements in contact with one another in the presence of saturated steam to react said lime, said silica, and said required amounts of water to produce in said first element a hydrous calcium silicate which is more compact than the hydrous calcium silicate of said second element; and removing the excess water from said elements to produce in said first element a dry hydrous calcium silicate which is denser than the dry hydrous calcium silicate of said second element.

5. A composite structural unit comprising a strength element comprising hydrous calcium silicate having micropores making up not more than 35% of the total volume of the strength element, and an insulating element comprising hydrous calcium silicate having micropores making up between 75% and 95% of the total volume of the insulating element, said unit being further characterized by an inter-element bond consisting essentially of hydrous calcium silicate.

6. A composite structural unit including a strength element and an insulating element; said strength element comprising asbestos fibers dispersed in a Portland cement-silica-water reaction product and having micropores making up about 30% to 35% of the total volume of the sheet; and, said insulating element comprising asbestos fibers dispersed in a hydrous calcium silicate having micropores making up from 75% to 95% of the total volume of the insulating element; said unit being characterized by an inter-element bond consisting essentially of hydrous calcium silicate.

7. A structural unit in accordance with claim 5 in which the strength element extends in at least one direction beyond the edge of the insulating element.

8. A composite structural unit including a first element comprising hydrous calcium silicate having micropores making up a portion of the total volume of said element, and, a second element comprising hydrous calcium silicate having micropores making up a portion of the volume of said second element which is at least double the volume of the micropores in the first element; said unit being characterized by an inter-element bond consisting essentially of hydrous calcium silicate.

9. A unit in accordance with claim 5 in which asbestos fibers are dispersed in one of said elements.

10. A unit in accordance with claim 5 in which asbestos fibers are dispersed in the strength element and in the insulating element.

11. A unit in accordance with claim 5 in which the strength element is a corrugated sheet.

References Cited in the file of this patent
UNITED STATES PATENTS

| | | |
|---|---|---|
| 1,140,559 | Atterbury | May 25, 1915 |
| 1,732,368 | Lane | Oct. 2, 1929 |
| 1,770,767 | Collings et al. | July 15, 1930 |
| 1,804,753 | Douglas | May 12, 1931 |
| 2,237,258 | Jacobs | Apr. 1, 1941 |
| 2,241,604 | Knibbs et al. | May 13, 1941 |
| 2,421,721 | Smith et al. | June 3, 1947 |
| 2,446,782 | Otis et al. | Aug. 10, 1948 |
| 2,540,354 | Selden | Feb. 6, 1951 |
| 2,544,488 | Chittenden | Mar. 6, 1951 |